(12) United States Patent
Lustig et al.

(10) Patent No.: US 8,502,157 B2
(45) Date of Patent: Aug. 6, 2013

(54) BORON CONTAINING COATING FOR NEUTRON DETECTION

(75) Inventors: James Michael Lustig, Mantua, OH (US); Jon Bennett Jansma, Pepper Pike, OH (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 13/228,478

(22) Filed: Sep. 9, 2011

(65) Prior Publication Data

US 2013/0062531 A1    Mar. 14, 2013

(51) Int. Cl.
*G01T 3/00* (2006.01)

(52) U.S. Cl.
USPC ..................... 250/392; 250/370.11

(58) Field of Classification Search
USPC ............................. 250/370.11, 392
See application file for complete search history.

(56) References Cited

U.S. PATENT DOCUMENTS

| | | | | |
|---|---|---|---|---|
| 7,233,007 | B2* | 6/2007 | Downing et al. | 250/390.11 |
| 2010/0078570 | A1* | 4/2010 | Frank | 250/370.05 |
| 2010/0258736 | A1* | 10/2010 | McCormick et al. | 250/390.01 |
| 2010/0314549 | A1 | 12/2010 | Wang et al. | |
| 2012/0161023 | A1* | 6/2012 | Wang et al. | 250/390.01 |
| 2012/0217406 | A1* | 8/2012 | McGregor et al. | 250/361 R |

OTHER PUBLICATIONS

Hardy, George F., "Role of Critical Coating thickness in Electrostatic Powder Deosition," Journal of Patent Technology, vol. 46, No. 5, Dec. 1974.
Smialek, R.L.,"Electrostatic coating of Lamp Envelopes," Lighting Research and Technical Services Operation-Lamp Envelope Materials Research Laboratory, Mar. 28, 1975.
Martyny, W.C., "The Electrostatic Deposition of Fluorescent Phosphors on Panel Fluorescent Lamps," Panel Lamp Project #439, Aug. 27, 1965.
Jansma, J.B., "Application of Phosphor Coatings to Fluorescent Lamps Using an Experimental Elecyrostatic coating Process," Aug. 21, 1984.

* cited by examiner

*Primary Examiner* — Christine Sung
(74) *Attorney, Agent, or Firm* — Cooper Legal Group, LLC (57) ABSTRACT

A neutron detector includes an exterior shell bounding an interior volume. The neutron detector includes at least a wall portion serving as a cathode. In one example the wall portion has microfeatures. The neutron detector includes a central structure located within the interior volume and serving as an anode. The neutron detector includes a boron coating on the wall portion. In on example, the boron coating is applied by an electrostatic spray process. In one example, the boron coating conforms to the microfeatures on the wall portion. In one example, the wall portion has a thickness of between 2 to 5 microns. The neutron detector includes an electrical connector operatively connected to the central structure for transmission of a signal collected by the central structure. An associated method provides for depositing the boron coating.

7 Claims, 4 Drawing Sheets

BORON CONTAINING COATING FOR NEUTRON DETECTION

BACKGROUND OF THE INVENTION

1. Field of the Invention

The invention relates to boron coatings for neutron detection, and specifically relates to electrostatic spray application of boron coatings for neutron detection.

2. Discussion of Prior Art

Tubular neutron detectors can include boron coatings to interact with passing neutrons and release charged particles into an enclosed volume to create an electrical signal. Optimal performance of the neutron detector can depend upon several factors including: relatively thin, uniform boron coatings over the length of the neutron detector, minimal traces of other elements and compounds, and the ratio of particular boron isotopes in the total boron coating content.

Previously known methods of depositing the boron onto a surface of the neutron detector can create irregular thickness of boron coatings over the length of the neutron detector. These same methods can create boron coatings with undesired gaps caused by capillary action around microfeatures of the detector surface. Other known methods include the use of binders to adhere the boron to the neutron detector, introducing impurities that can interfere with neutron detection. Additionally, some previously known methods of depositing the boron onto a surface of the neutron detector can be relatively expensive. Therefore, there is a need for an optimized boron application process that creates relatively thin, uniform boron coatings over the length of the neutron detector with minimal traces of other elements and compounds.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a neutron detector including an exterior shell bounding an interior volume. The neutron detector includes at least a wall portion serving as a cathode. In one example, the wall portion has microfeatures. The neutron detector includes a central structure located within the interior volume and serving as an anode. The neutron detector includes a boron coating on the wall portion wherein the boron coating is applied by an electrostatic spray process. In one example, the boron coating conforms to the microfeatures on the wall portion. The neutron detector includes an electrical connector operatively connected to the central structure for transmission of a signal collected by the central structure.

In accordance with another aspect, the present invention provides a neutron detector includes an exterior shell bounding an interior volume. The neutron detector includes at least a wall portion serving as a cathode and having microfeatures. The neutron detector includes a central structure located within the interior volume and serving as an anode. The neutron detector includes a boron coating on the wall portion. The boron coating conforms to microfeatures on the wall portion and has a thickness of between 2 to 5 microns. The neutron detector includes an electrical connector operatively connected to the central structure for transmission of a signal collected by the central structure.

In accordance with another aspect, the present invention provides a method of depositing a boron coating on a surface of a neutron detector. The method includes providing a conductive surface of the neutron detector. In one example, the wall portion has microfeatures. The method includes electrostatically spraying the conductive surface of the neutron detector with a boron-containing powder resulting in a boron coating over the conductive surface of the neutron detector. In one example, the boron coating conforms to the microfeatures located on the conductive surface of the neutron detector.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 1:
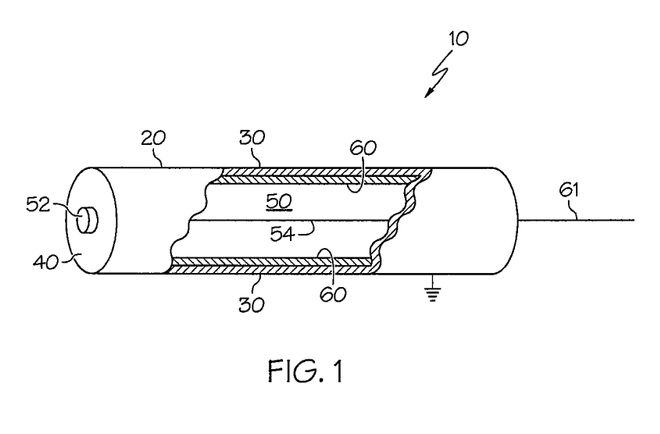
FIG. 1 is a schematized view of an example neutron detector with a boron coating in accordance with an aspect of the present invention.

A schematic rendering of an example neutron detector 10 is generally shown within FIG. 1. It is to be appreciated that FIG. 1 shows one example of possible structures/configurations/etc. and that other examples are contemplated within the scope of the present invention. In one specific example, the neutron detector 10 is used for detecting passing neutrons, for example, by observing the charged particles released in nuclear reactions induced by the neutrons. Neutron detectors 10 can be used in various applications such as radiation monitoring of spent nuclear fuel or in homeland security applications.

The neutron detector 10 can include an exterior shell 20. The exterior shell 20 may have a circular cross-section, forming a cylindrical exterior shell 20, although other cross-section shapes are also contemplated. The exterior shell 20 can include a wall 30 and two ends 40 to bound an interior volume 50 that can contain a gas. The wall 30 is one example of a wall portion 30. It is to be appreciated that the wall portion may be all or part of a wall, or any other structure that has a wall surface that is electrically connected to the exterior shell 20.

In an electrical circuit, the exterior shell 20 can act as a cathode. An insulator 52 can be located on the two ends 40 of the exterior shell 20 to hold a central structure 54 in place and prevent electrical charges from passing between the central structure 54 and the exterior shell 20 through direct contact. The central structure 54 can be generally located near the central axis of the exterior shell 20. The central structure 54 can be of similar proportions to a wire, and can act as an anode in an electrical circuit. A boron coating 60 covers the interior surface of the wall 30. The neutron detector 10 also includes an electrical connector 61 mounted on one of the insulators 52 for transmission of a signal collected by the central structure 54.

Figure 2:
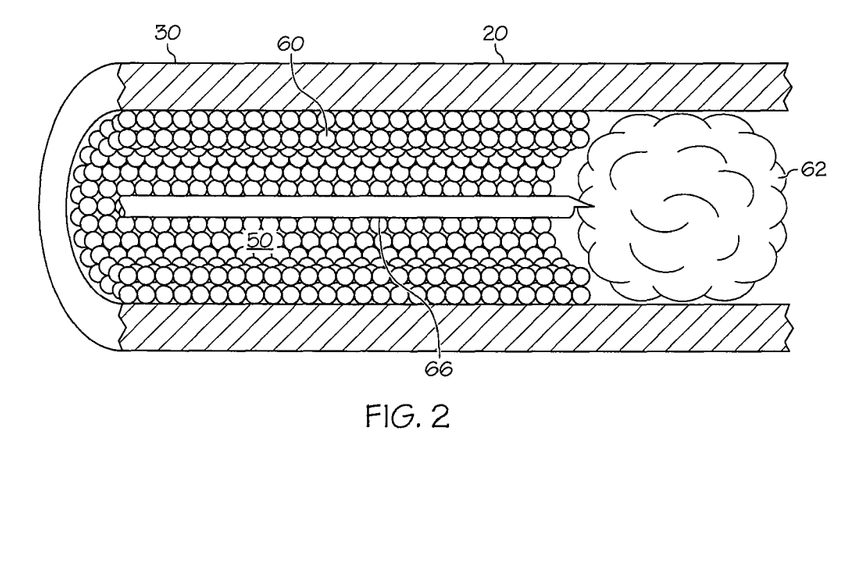
FIG. 2 is a cross-sectional view of a portion of the example neutron detector of FIG. 1 during a boron deposition process in accordance with an aspect of the present invention.
Figure 3:
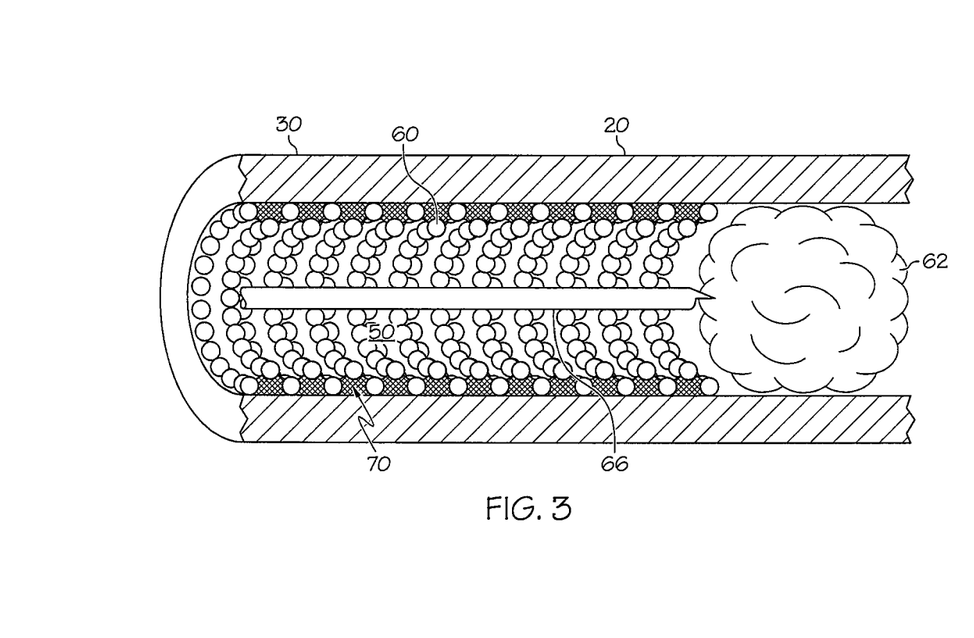
FIG. 3 is a cross-sectional view of a portion of the example neutron detector of FIG. 1 during a boron deposition process that includes a binder in accordance with an aspect of the present invention.

Turning to FIG. 2, the boron coating 60 is applied to the interior surface of the wall 30 by an electrostatic spray application, also known as electrocoating. It is to be appreciated that the particles making up the boron coating 60 shown in FIGS. 2 and 3 are for illustration purposes only and do not represent actual particle sizes or scale sizes and thus should not be used for relative dimensioning (e.g., the particle size may be exaggerated). Furthermore, the particle shapes are only spherical representations of boron-containing powder particles. The boron-containing powder particles can include irregular shapes and profiles. The electrostatic spray application includes fluidizing small particles of boron or a boron-containing powder 62 within a carrier fluid. Examples of carrier fluid include compressed gases such as air, nitrogen, argon, and other gases as are known in the art. The fluidized particles are passed through an atomizer and electrostatically charged. The electrostatic charging may occur triboelectrically, by means of a corona discharge from a high voltage electrode, or by any other particle charging methods as are known in the art. The electrostatic spraying operation can include the use of a standard electrostatic spray gun 66 as is known in the art. The fluidized particles are sprayed onto a conductive surface which can be the interior surface of the wall 30 of the exterior shell 20 of the neutron detector 10. The electrostatic spray gun 66 can be moved through the interior volume 50 to reach the entire area of the conductive surface. Examples of the conductive surface include, but are not limited to, metals, non-metals with a metalized deposition layer, and heated glass. During the electrostatic spray process, the conductive surface is electrically grounded, thereby providing electrical attractive forces (or adhesion forces) between the conductive surface and the electrostatically charged fluidized particles of the boron-containing powder 62.

At the time of electrostatic spray application of the fluidized particles of the boron-containing powder 62, electrostatic image forces adhere the fluidized particles to the conductive surface and arise whenever a charged object is brought near a conducting body. At equilibrium, there can be no electric field in a conductor. As a result, charges move to its surface to screen out the field of any external charges. Outside the conductor, the effects of this surface charge are identical with those which would be observed if the conductor were removed and then replaced by an equal and opposite mirror image of the external charged body. The attraction between the charged fluidized particles and their "images" in the conductor holds the coating of fluidized particles in place. The electrostatic image forces are the principal forces of adhesion immediately after electrostatic deposition of the fluidized particles. These forces typically dissipate within a relatively short timeframe, sometimes lasting from several minutes to several hours.

Following the dissipation of the electrostatic image forces, three kinds of adhesion forces have sufficient magnitude and extent to account for the ultimate adhesion of the electrostatically deposited fluidized particles onto the conductive surface. These forces are electrostatic contact potential forces, Van der Walls forces, and capillary forces. Electrostatic contact potential forces direct and adhere the fluidized particles to the conductive surface, and these electrostatic forces remain the principal force of adhesion following the dissipation of the electrostatic image forces. The sign of the electrical charge on the fluidized particles is such that the Coulombic force from this adhesion mechanism adds constructively to the force resulting from both triboelectric and corona charging methods of charging the fluidized particles. The electrostatic contact potential forces apply only to dissimilar materials in contact. Therefore, it can contribute to coating adhesion to the conductive surface but not to cohesion of the fluidized particles to each other. The electrostatic contact potential forces disappear when the electrostatic spray apparatus no longer produces an electric field, or when the conductive surface is moved away for subsequent processing.

Van der Walls forces also help adhere the fluidized particles to the conductive surface. Van der Walls forces will be present in any system where bodies are brought into close contact. Although the magnitude of these forces is somewhat dependent on the choice of the fluidized particles (such as a boron-containing compound), it is typically high enough to result in adequate adherence of the fluidized particles to the conductive surface if the particles are sufficiently small and the boron coating 60 is formed in such a way as to provide numerous intimate contacts between particles. For fluidized particles in intimate contact, the Van der Walls forces can be quite strong, but the force is only effective across the actual area of contact.

Capillary forces also help adhere the fluidized particles to the conductive surface. The presence of a liquid in the region of contact between two fluidized particles or between a fluidized particle and the conductive surface can greatly affect adhesion forces. Capillary forces can be orders of magnitude higher than the other adhesion forces described. Because of this, a steaming operation is sometimes used to temporarily improve the adherence of an electrostatically deposited coating. As the water evaporates, the capillary forces disappear. Nevertheless, there is often a beneficial residual increase in adhesion resulting from local small particle rearrangements or increases in contact area when capillary forces are present.

Turning to FIG. 3, if the described adherence forces do not provide the required adherence between the fluidized particles and the conductive surface, additives or binders 70 can be added to the process in either powder or liquid form. These binders 70 are typically polymers that may be heat-cured, or solvated polymers that will cure upon evaporation of the solvent. However, additives or binders 70 are not necessarily present.

Four parameters have been determined to significantly affect the resulting electrostatic spray deposition of the boron or the boron containing powder: particle size, particle conductivity, humidity, and high voltage settings for the spray apparatus. Particle size has a strong effect on the boron coating 60 formation. The saturation charge on an individual particle varies as the square of the particle radius ($r^2$). Since the number of particles per unit thickness of coating varies as the inverse of the cube of the particle radius ($1/r^3$), the charge on the coating is proportional to the inverse of the particle radius ($1/r$). Therefore, the smaller the particle size, the higher the charge and the better the electrostatic adherence.

Particle size also affects the resultant electrostatic spray deposition of the boron or the boron containing powder because of its relationship with particle terminal velocity. Terminal velocity of the fluidized particles is directly proportional to the particle radius. The smaller the size, the lower the velocity relative to the carrier fluid of the electrostatic spray atomizer and therefore the lower the deposition rate. Additionally, if the fluidized particles are deformable, the lower particle velocity will cause less elastic deformation upon collision with the conductive surface, resulting in a somewhat weaker than possible Van der Waals adhesion force.

Particle size further affects the boron coating 60 thickness dimension. The first fluidized particles to hit the conductive surface are attracted to the conductive surface by their image force which is equal to the square of the particle charge divided by four times the square of the particle radius ($q^2/4r^2$). Under most conditions, the deposited particles dissipate their charges slowly and each succeeding layer adds to the surface potential. Eventually, at some limiting boron coating 60 thickness, no further deposition will occur on the conductive surface. Any attempt to exceed this critical thickness will raise the surface potential to above the dielectric strength of the layer, resulting in localized electrical discharge, and most of the charge will leak-off to the conductive surface. Any attempt at electrospraying additional boron-containing powder 62 onto the conductive surface will result in the additional fluidized particles dropping away from the coating due to insufficient adherence forces to maintain their position on the coating surface. The limiting coating thickness will depend on the particle size with smaller particle sizes typically resulting in a reduced limiting coating thickness. In one example the limiting coating thickness can be about 25 microns.

Particle conductivity is another factor that can significantly affect the resultant electrostatic spray deposition of the boron or the boron containing powder. For fluidized particles exhibiting conductivity greater than about $10^{-8}$ siemens centimeter$^{-1}$ (Scm$^{-1}$), triboelectric charging is minimal and the corona charge is lost rapidly to the conductive surface, lessening powder adherence to the conductive surface. Fluidized particles exhibiting even greater conductivity, charge may be gained from the conductive surface and the powder will tend to repel itself from the conductive surface. For powders exhibiting conductivity less than about $10^{-12}$ to $10^{-14}$ Scm$^{-1}$, deposition efficiency suffers because charge can not be neutralized by the collecting surface during the deposition. Fluidized particles with little conductivity tend to create a voltage gradient between the outer powder layers and the conductive surface can exceed that for spark breakdown of air and creating a condition known as "back-corona cratering" or "voltage holes." Localized breakdowns create oppositely charged ions which neutralize the powder charge and create craters in the deposited powder. Fluidized particle conductivity is a significant factor in powder deposition efficiency in electrostatic spray deposition applications. Conditioning the temperature or humidity of the electrostatic deposition environment can beneficially alter the conductivity of the powder. Common conditioning agents can include, but are not limited to: water vapor, triethylamine, $H_2SO_4$, $SO_2$, NaCl, and NaOH.

Humidity of the electrostatic deposition environment is another factor that can significantly affect the resultant electrostatic spray deposition of the boron or the boron containing powder. There is a maximum voltage that can be applied between the electrostatic spray equipment and the conductive surface, after which the spark breakdown of air occurs. Generally, at a constant temperature, the maximum voltage applied can be increased at higher humidity levels. As a result, the higher the humidity, the higher the usable charging and driving voltage can be utilized in the electrostatic deposition application. However, if the humidity is so high that moisture actually condenses on the electrostatic spray equipment, then other voltage leakage paths can develop. Additionally, if the powder exhibits a high conductivity, high humidity may have negative effects on the powder charging process. Humidity also plays a significant role in the capillary forces that were previously described.

The high voltage setting for the electrostatic spray equipment is another factor that can significantly affect the resultant electrostatic spray deposition of the boron or the boron containing powder. There is a direct relationship between the maximum charge of a particle and the high voltage setting of the electrostatic spraying device. As such, an increase in the magnitude of the voltage of the electrostatic spraying device can increase the powder coating thickness because there is an increase in magnitude of the powder particle charges and the formation of a more dense powder particle cloud at the electrostatic spraying device electrode. The resulting increase in powder coating thickness can lead to more effective boron powder coating of the conductive surface by allowing faster electrostatic spraying device linear speed and fewer applications to achieve a desired boron coating 60 thickness.

Electrostatic spraying of boron-containing powders 62 to create a boron coating 60 on the interior surface of a neutron detector 10 can provide the additional benefit of uniformly conforming to surface features of the conductive surface. Microfeatures such as elevations and depressions on the face of the conductive surface may be present, and such microfeatures can be inadequately covered by typical boron coating applications. For example, one method of a boron coating application includes dipping the conductive surface into water-based dispersions of boron or boron compounds. The capillary action of the water molecules can preclude the boron or boron compounds from uniformly covering the microfeatures of the conductive surface. Some applications of boron coatings for a neutron detector can involve a slurry application of the boron coating to the interior of a cylindrical body. During subsequent drying operations, gravitational force can affect the thickness of the boron coating, as the slurry can flow prior to complete drying. Electrostatic spray application of the boron-containing powder can eliminate the undesired effects of gravitational force upon the slurry of boron-containing powder. For example, a cylindrical neutron detector component can be hung so that the cylinder's axis is in a vertical orientation in order to dry the slurry coating the inside diameter. Gravitational forces then naturally pull the slurry downward through the cylinder to create an uneven boron coating and a variable inside diameter over the length of the cylinder. The variable inside diameter of the boron coating is typically a thinner coating at the top of the cylinder and thicker at the bottom of the cylinder after this drying method. This can be particularly problematic in longer lengths of cylinders. Alternatively, electrostatic spraying applications provide electrostatic attraction of the boron-containing powder 62 directly to all areas of the face of the conductive surface, including any present microfeatures such as localized elevations and depressions. This creates better end-to-end coating consistency on the interior diameter of the cylinder.

It is to be understood that the boron-containing powder 62 can include pure boron, a boron compound, or a mixture containing boron. The boron-containing powder 62 can also include a specific ratio of the naturally occurring isotopes of boron. For example, the total boron content can be a minimum of about 97% by weight and the ratio of $^{10}$B isotope to the total boron content can be a minimum of about 98% by weight. Boron has two naturally occurring isotopes, $^{10}$B and $^{11}$B, typically found in a ratio of about 20% $^{10}$B to about 80% $^{11}$B. In average circumstances, the two isotopes react quite differently when interacting with a free neutron. Ideally, neutrons entering the neutron detector 10 are absorbed by the $^{10}$B which then releases other charged particles that can cause a cascade of particle interactions which then interact with a central structure 54 anode portion of the neutron detector 10 (best seen in FIG. 1). A typical neutron detector 10 relies on these released charged particles and the cascade of other resultant particle interactions to develop a signal representing a detected neutron or group of neutrons. However, the $^{11}$B isotope simply absorbs the neutron without releasing other charged particles, making $^{11}$B ineffective for use in neutron detection applications. This difference in neutron absorption behavior between the two naturally occurring boron isotopes means that the ratio of $^{10}$B isotope to the total boron content is approximately equal to the effectiveness of the neutron detector 10. For example, if a boron coating 60 contains 92% $^{10}$B and 8% $^{11}$B, the neutron detector 10 will be 92% effective (disregarding small quantities of impurities in the coating) over the coated area. Therefore, it is desirable to create a ratio of $^{10}$B isotope to the total boron content in the boron-containing powder 62 that is as high as is practicably attainable.

In one example, the boron-containing powder 62 can include crystalline boron particles created by jet milling a boron feed stock to a specified particle size. For example, more than about 75% of the particles are less than about 1 micron in diameter, more than about 95% of the particles are less than about 3 microns in diameter, and essentially all of the particles are less than about 15 microns in particle diameter. Optimal neutron detector 10 performance depends in part upon a relatively thin boron coating 60 applied to the neutron detector wall 30 of the exterior shell 20. Ideally, neutrons entering the neutron detector 10 are absorbed by the boron which then releases other charged particles that can cause a cascade of particle interactions within the interior volume 50 which then interact with the anode portion of the neutron detector 10. However, if the boron powder application is relatively thick, the boron will simply absorb the neutron without releasing other charged particles and become "self-trapping," rendering the neutron detector 10 ineffective. Therefore, it is desirable to obtain an optimized boron powder with particle sizes of about 1 micron in diameter to enable relatively thin coatings on the neutron detector 10 surface. Boron particle sizing of about 1 micron is particularly effective for electrostatic spray applications by an electrostatic spray gun 66 and also in various other methods of boron-containing powder 62 deposition for neutron detection. The desired boron coating 60 thickness in a neutron detector 10 can be 2-5 microns thick, or alternatively, 3-4 microns thick.

Electrostatic spray applications are particularly well-suited to applying uniform, thin coatings to conductive surfaces due to the electrostatic adhesion forces depositing powders across a conductive surface one layer at a time. For example, uneven application of charged boron particles does not happen because the adhesion forces resulting from an electrostatic spray operation direct the powder particles to areas on the conductive surface applying the most force to attract the boron particles. The areas applying the most force to attract the boron particles are those areas with no layer of boron particles covering the conductive surface. Additional boron particles will not be attracted to nor adhere to areas already covered by a layer of boron particles and will necessarily be directed first to areas having no boron particles. Only after the entire surface of the conductive surface is covered with boron particles will a second layer of boron adhere to the previously deposited boron particles. The electrostatic spray application of boron-containing powder 62 can deposit a single layer of boron particles that is effective for neutron detection in one pass of the spray apparatus, however, multiple passes of the spray apparatus are also contemplated.

After the electrostatic spray application is complete, the conductive surface and boron coating 60 may undergo subsequent processing to further adhere the boron coating 60 to the conductive surface, but this is not a necessary step. In one example, the conductive surface and the boron coating 60 may be subject to increased temperatures in order to boride the conductive surface wherein boron molecules migrate into the conductive surface. However, in many cases, the adherence forces described will adequately adhere the boron coating 60 to the interior surface of the wall 30 without further processing. Other operations after electrostatic spraying can also be conducted including a moisture treatment to remove any unneeded electrostatic charges on the boron coating 60 and the conductive surface.

In one example of a boron-containing powder 62 for neutron detection applications, soluble residue comingled with the boron powder is less than $7.00 \times 10^{-4}$ grams of soluble residue per gram of boron. One example of a soluble residue is an organic contaminant. It is to be appreciated that the term organic is a broad and expansive classification. In one part, the classification includes materials that contain a carbon component. The organic contaminants can be introduced to the boron powder during a jet milling operation from sources such as air compressor oils, particles of a polymeric liner material used on the interior of a jet mill, and adhesive materials used to adhere polymeric liner material to the interior wall of a jet mill. Electrostatic spraying of boron-containing powder 62 do not necessarily require binders 70 to adhere the powder to the conductive surface. As a result, the electrostatic spray application of boron-containing powder 62 can reduce the amount of soluble residue in the finished boron coating 60 as compared to some previously known boron application processes such as boron powder in oil with rubber binder based dispersions.

Optimal neutron detector 10 performance depends in part upon minimal levels of soluble residues in the boron powder applied to the neutron detector 10 surface. Soluble residues such as organic contaminants can outgas, introducing organic compounds to an interior volume 50 of the neutron detector 10. During the manufacturing process, the interior volume 50 is filled with a specific formulation of gases for effective operation of the neutron detector 10. The organic compounds resulting from outgassing can foul this specific formulation of gases and reduce the effective operation of the neutron detector 10. Thus, it is particularly desirable to have a boron-containing powder 62 containing less than $7.00 \times 10^{-4}$ grams of soluble residue per gram of boron for neutron detection applications.

The electrostatic spray application of boron containing powders can also eliminate the need for binders 70 in the application of a boron coating 60 to the interior surface of the neutron detector wall 30. Electrostatic spray operations can rely upon a compressed gas and electromagnetic forces to propel the boron-containing powder 62 to the conductive surface and adhere the powder to the conductive surface. Electromagnetic adhesion forces can be utilized to be the only forces required to maintain the boron coating 60 on the conductive surface.

Neutron detector 10 effectiveness can be negatively affected by chemical elements and chemical compounds comingled with boron in the boron coating 60. Removal of binder 70 material from the boron coating application process helps limit the amount of material in the boron coating 60 that can reduce the effectiveness of the neutron detector 10. Gamma radiation can force materials other than boron to discharge charged particles into the interior volume 50 of the neutron detector 10. In turn, these charged particles can be attracted to the central structure 54 anode of the neutron detector 10, creating a false positive neutron detection signal. Boron is unaffected by gamma radiation and will not discharge charged particles resulting from interactions with gamma radiation to create a false positive neutron detection signal. As a result, elimination of the binders 70 can result in a more effective neutron detector 10. Additionally, removal of the binders 70 helps limit the amount of soluble residue that can be comingled with the boron-containing powder 62. Optimal neutron detector 10 performance depends in part upon minimal levels of soluble residues in the boron-containing powder 62 applied to the neutron detector 10 conductive surface as previously described.

Electrostatic spraying of boron-containing powders 62 can also lower the cost of manufacturing a neutron detector 10 while also helping to ensure consistent neutron detector 10 sensitivity. For example, electrostatic spraying of boron-containing powders 62 can take place at ambient temperature and ambient pressure, eliminating the cost of maintaining a special environment for the boron coating application. The electrostatic spraying of boron-containing powders 62 can also take place with little or no cover gases, eliminating the cost of a special environment. The elimination of these variables in the manufacturing process also helps to ensure repeatable, reproducible results in the sensitivity level of neutron detectors 10. Electrostatic spray application of boron coatings 60 can lower production costs for neutron detectors 10 in comparison to other methods of boron-containing powder application techniques such as vacuum deposition.

Electrostatic spraying of boron-containing powders 62 can also lower the amount of waste in the neutron detector 10 production process by applying an amount of boron-containing powder 62 onto the conductive surface that is closer to the actual amount of boron-containing powder 62 that will remain on the conductive surface in the final product. Methods utilizing a slurry of boron-containing powder 62 and subsequent draining of extraneous material have comparatively greater amounts of waste product.

Another advantage of electrostatic spraying of boron-containing powders 62 in comparison to slurry application is reduced cost and effort related to the storage of the boron material prior to application. Neutron detector 10 manufacturing operations utilizing electrostatic spraying of boron-containing powders 62 include storage of dry boron powders. Alternatively, previously known slurry applications of boron include storage of boron-containing liquids. These liquids introduce storage and manufacturing process concerns such as maintenance of proper viscosity in the stored liquid, mold growth, fungus growth, recovery of liquid that has been drained as extraneously applied to neutron detector 10 cylinders, filtration of the liquid, and minimization of agglomerates within the liquid. The storage and electrostatic spraying of boron-containing powders 62 include none of these concerns.

Additionally, electrostatic spraying of boron-containing powders 62 reduces concerns for oxidation of the boron molecules in comparison to slurry based applications. The presence of water in boron slurry introduces the possibility for dissociation of water molecules, allowing free oxygen to bond with boron molecules. Oxidized boron molecules, when included in the boron coating 60 of a neutron detector 10, are known to reduce the efficiency of the neutron detector 10.

Figure 4:
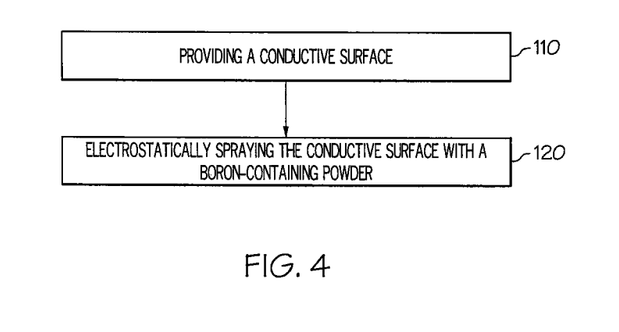
FIG. 4 is a top level flow diagram of an example method of depositing a boron coating on a surface of a neutron detector in accordance with an aspect of the present invention.

An example method of depositing a boron coating 60 on a conductive surface of a neutron detector is generally described in FIG. 4. The method can be performed in connection with the example neutron detector shown in FIG. 1 and the application of fluidized particles shown in FIGS. 2 and 3. The method includes the step 110 of providing a conductive surface of the neutron detector. The conductive surface can be manufactured from metals, non-metals with a metalized deposition layer, or glass which is heated to improve its conductivity. The conductive surface can be the interior surface of a cylinder, although other geometric shapes including interior surfaces are also contemplated.

The method also includes the step 120 of electrostatically spraying the conductive surface of the neutron detector with a boron-containing powder. During the electrostatic spray process, the conductive surface is electrically grounded, thereby providing electrical adhesion forces between the conductive surface and the electrostatically charged fluidized particles of the boron-containing powder. The adhesion forces bond the fluidized particles to the conductive surface. The resultant boron coating 60 has an optimal thickness applied uniformly over the conductive surface of the neutron detector. Additionally, the boron coating 60 conforms to any present microfeatures located on the conductive surface of the neutron detector.

In one example of the method, a binder can be applied to the conductive surface contemporaneous with the electrostatic spraying of the fluidized particles of the boron-containing powder. This additional step can be necessary when electrostatic adhesion forces are not strong enough to hold the boron coating in place on the conductive surface. In another example of the method, the uniform thickness of the boron coating is between 2 to 5 microns. In yet another example of the method, the uniform thickness of the boron coating is between 3 to 4 microns.

In another example of the method, the boron-containing powder includes a minimum total boron content of about 97% by weight and a minimum ratio of $^{10}B$ isotope to the total boron content of about 98% by weight. In another example of the method, the boron-containing powder includes a quantity of a soluble residue comingled with the boron of less than $7.00 \times 10^{-4}$ grams of soluble residue per gram of boron.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method of depositing a boron coating on a surface of a neutron detector including:
    providing a conductive surface of the neutron detector; and
    electrostatically spraying the conductive surface of the neutron detector with a boron-containing powder resulting in a boron coating over the conductive surface of the neutron detector.

2. The method according to claim 1, wherein the step of providing a conductive surface of the neutron detector includes providing the conductive surface to have microfeatures located on the conductive surface, and the step of electrostatically spraying the conductive surface of the neutron detector with a boron-containing powder results in a boron coating over the conductive surface that conforms to the microfeatures located on the conductive surface.

3. The method according to claim 2 further including an application of a binder to the conductive surface.

4. The method according to claim 2, wherein the thickness of the boron coating is between 2 to 5 microns.

5. The method according to claim 2, wherein the thickness of the boron coating is between 3 to 4 microns.

6. The method according to claim 2, wherein the boron-containing powder includes a minimum total boron content of about 97% by weight and a minimum ratio of $^{10}$B isotope to the total boron content of about 98% by weight.

7. The method according to claim 2, wherein the boron coating includes a quantity of a soluble residue comingled with the boron of less than $7.00 \times 10^{-4}$ grams of soluble residue per gram of boron.

* * * * *